Sept. 8, 1953

J. WILSON 2,651,213

GEARED HAND BRAKE

Filed Feb. 25, 1950

INVENTOR.
Jack Wilson
BY
Mann and Brown
Atty's.

Sept. 8, 1953        J. WILSON        2,651,213
GEARED HAND BRAKE
Filed Feb. 25, 1950        3 Sheets-Sheet 2
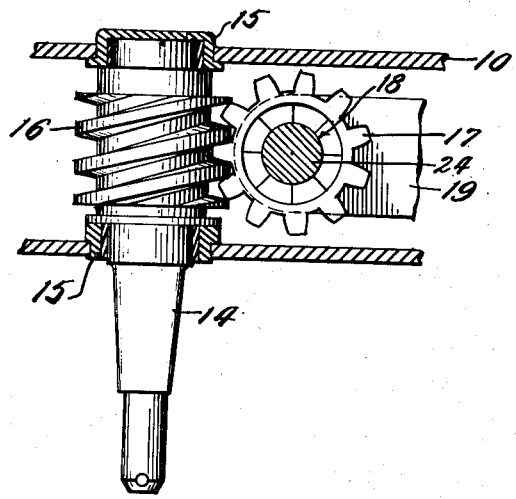
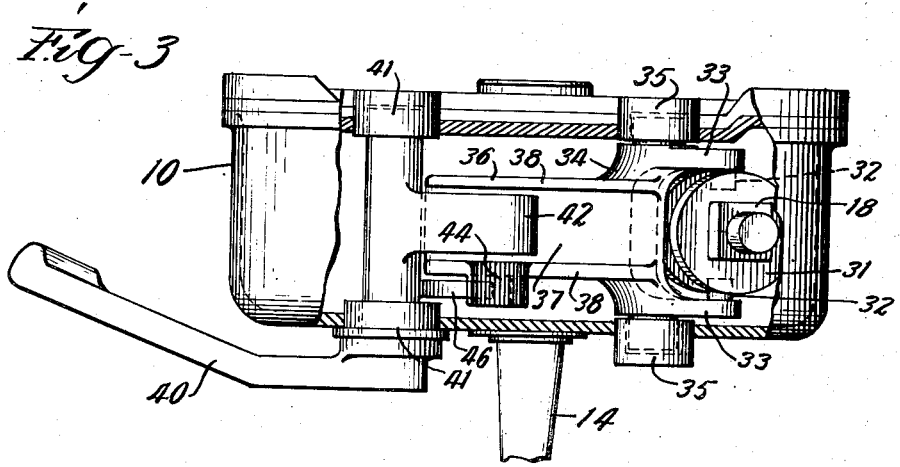
INVENTOR.
Jack Wilson
BY
Mann and Brown
Attys.

Sept. 8, 1953 J. WILSON 2,651,213
GEARED HAND BRAKE
Filed Feb. 25, 1950 3 Sheets-Sheet 3

INVENTOR.
Jack Wilson
BY
Mann and Brown
Attys.

Patented Sept. 8, 1953

2,651,213

UNITED STATES PATENT OFFICE 2,651,213

GEARED HAND BRAKE

Jack Wilson, Chicago, Ill., assignor to Universal Railway Devices Co., a corporation of Delaware Application February 25, 1950, Serial No. 146,321

5 Claims. (Cl. 74—505)

A. A. R. standard specifications for geared hand brakes (1949) establish certain relationships between the parts and between the hand brake and the safety appliances on the end of the car with which it is to be used, including the end ladder, overhanging end of the running board, etc. As a result there is a limited space within specified clearances with respect to all of the safety appliances within which the geared hand brake has to be able to take up not less than a minimum amount of the chain and develop the required power and the required travel in relation to the piston travel of the air brake.

As the safety appliances vary between box cars, gondolas, hoppers, and other miscellaneous cars, the practical application of the regulations has resulted in certain accepted conditions. For instance, among other things, attachment for the hand brake as a unit to the end of a gondola car or hopper car includes a specific location of bolt holes, and any hand brake to be universally salable to the railroads must conform to that as a basis as well as the other features of the A. A. R. regulations.

The principal object of this invention is to provide the simplest possible geared hand brake mechanism that will comply with all of the express and implied requirements and limitations. On account of the peculiar characteristics of worm gearing, the use of that mechanical movement as the primary gearing is preferred, and interposed between the worm gearing and the chain drum is additional gearing and preferably a quick release clutch.

Generally speaking, it has been found that the hand wheel shaft located directly above and in line with the winding drum can be gotten within the allowed space by putting the worm gear and associated bevel gearing on an axis inclined to the plane including the axes of the hand wheel shaft and the winding drum.

In the drawings:

Fig. 2 is a section on the line 2—2 of Fig. 1;

Fig. 3 is a plan view, with the casing broken away; and

Figure 1:
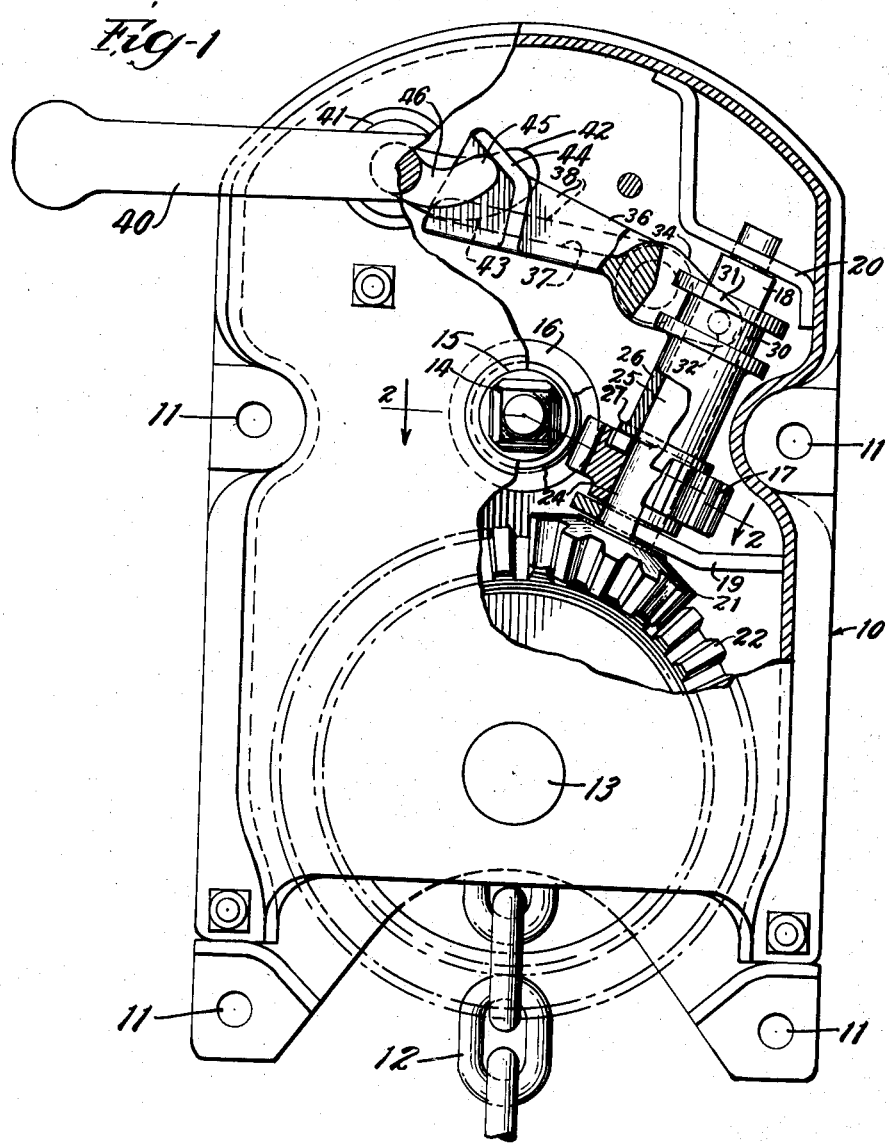
Fig. 1 is a front elevation of the hand brake assembly on the end of a freight car, parts of the casing being broken away.

The reference numeral 10 indicates generally a casing in which the mechanism is assembled to form a unit for sale, and which is adapted to be secured to the end of a car by bolts inserted through the openings 11.

A conventional chain 12 is adapted to be wound on a drum 13, journaled in the lower mid part of a casing on an axis substantially horziontal and lengthwise to the car.

The drum is driven by a hand wheel shaft 14 journaled on bearings 15 (Fig. 2) in the casing, and provided with a worm 16 meshing with and driving a worm gear 17 on a pinion shaft 18 journaled in brackets 19 and 20, and equipped with a beveled pinion 21 meshing with and driving a beveled gear 22 on the drum 13.

That arrangement provides ample power leverage between the hand brake wheel, normally 22″ in diameter, and the brake piston connection within the limits specified by the A. A. R. It also makes it possible and convenient to wind the A. A. R. standard $\tfrac{9}{16}$″ hand brake chain on the drum without overlapping and with convenient speed.

The teeth of the beveled gear 22 and the pinion 21 clear the chain in all positions of operation.

In order to provide a quick release feature, a clutch is interposed between the pinion shaft 18 and the worm gear 17 so that it can be disengaged from the pinion shaft for a quick release.

In the form here shown the pinion shaft is provided with a rounded section 24, which is free to revolve in the worm gear 17 when the clutch is released.

Above the rounded portion 24 the shaft has a polygonal section 25 on which a clutch sleeve 26 may be moved up and down to engage the teeth of the clutch head 27 with complemental teeth in the worm gear 17.

Near its upper end the clutch sleeve is provided with a ring 30 having spaced flanges 31 to receive pins 32 (Figs. 1 and 3) on the arms 33 of a clutch fork 34 fulcrumed in bearings 35 in the casing, and provided with a relatively long lever arm 36 having a depressed seating portion 37 between the side flanges 38.

The clutch fork is operated by a relatively long hand lever 40 fulcrumed at 41 in the casing, and having a bell crank arm 42 provided with a rounded contact surface 43 (Fig. 1) adapted to bear on the depressed surface 37 of the lever 36 with changing leverage as the hand lever is rotated clockwise in Fig. 1 to release the clutch.

One of the side flanges 38 of the lever arm 36 is provided with an inclined portion 44 to cooperate with the rounded bearing portion 45 of an auxiliary arm 46.

The preponderant weight of the hand lever 40 enables it to serve as weight for constantly urging the clutch toward engaged position due to the cooperation between the auxiliary arm 46 and the inclined surface 44.

In operation, the drum 13 is rotated to wind up the chain 12 by rotating the hand wheel shaft 14 in a clockwise direction, which makes the worm 16 act through the worm wheel 17, pinion shaft, pinion, and the beveled gear.

When the brake has been set up the gearing will hold it until it is desired to be released, when counter-clockwise rotation of the hand wheel shaft will effect any desired amount of release.

If the quick release feature is to be utilized, the hand lever 40 is raised, operating the clutch fork and releasing the clutch to disconnect the pinion shaft from the worm gear 17 and permit the bevel gearing to quickly spin to released position for the brakes.

The arrangement of the hand wheel shaft and drum with the axes spaced apart and lying within a generally vertical plane and substantially in line with the length of the car, together with placing the pinion shaft in a generally vertical plane at right angles to the axes of the hand wheel shaft and the drum shaft, and with the pinion shaft axis making an acute angle with the generally vertical plane which includes the axes for the hand wheel shaft and the drum shaft, provides a very compact and workmanlike arrangement of the gearing for operating the drum. It also makes it feasible to operate the clutch by the hand lever 40 of convenient length, acting both to release the clutch and to engage it.

In one form that has been found satisfactory, the worm is triple-threaded with 2¾" pitch diameter. The worm wheel is 3" pitch diameter. The beveled pinion is 3½" pitch diameter, and the bevel gear is 10" pitch diameter.

Figure 4:
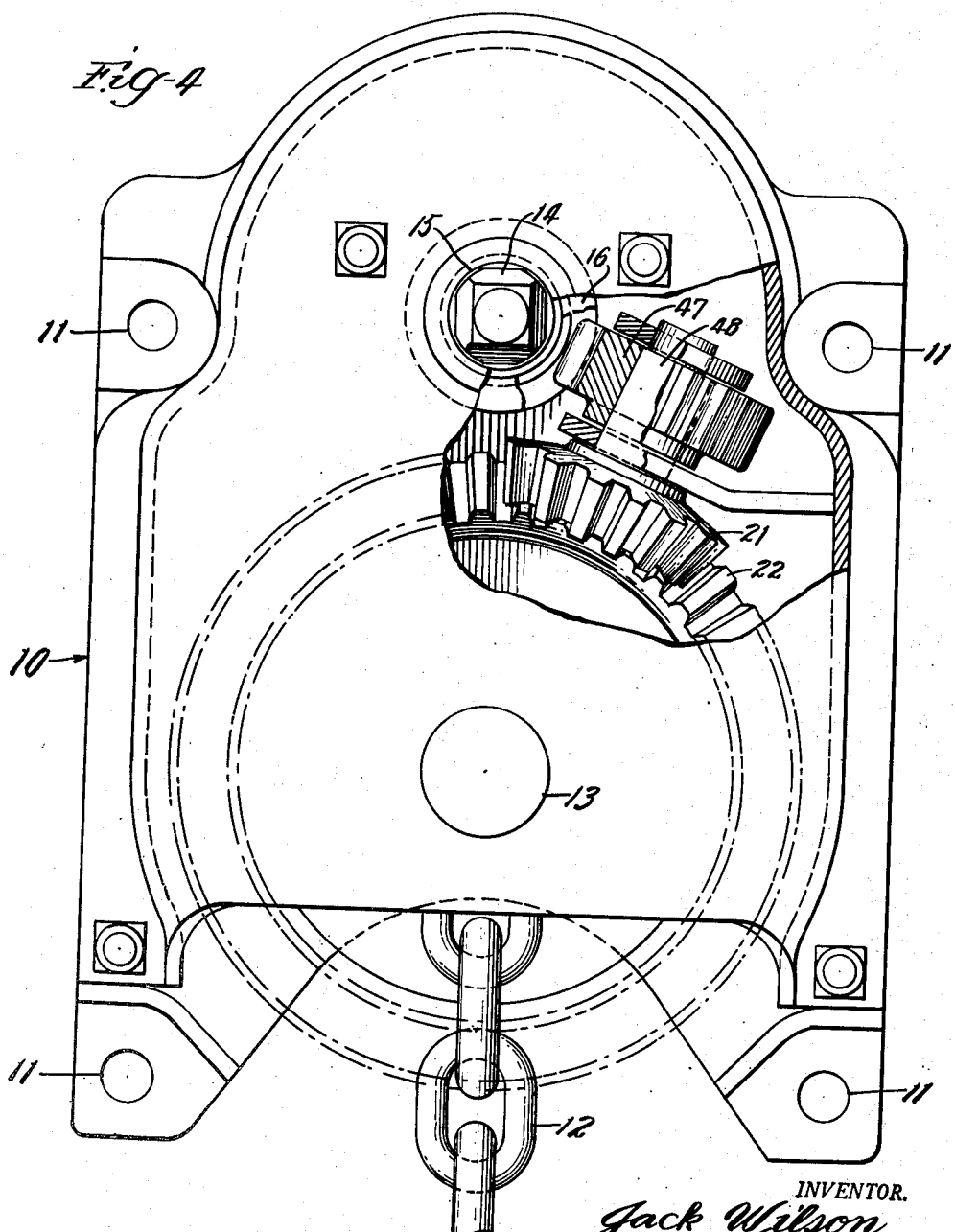
Fig. 4 is a view similar to Fig. 1 of a modified form in which the quick release feature is omitted.

In Fig. 4 there is a simplified arrangement of like mechanism in which the quick release feature is omitted and the worm gear 47 is keyed to the pinion shaft 48, arranged in substantially the same position as the pinion shaft 18 in the form first described. The operation is substantially the same, except that there is no quick release feature.

I claim:

1. In a hand brake for a railway car, a casing having relatively narrow side walls and relatively broad front and rear walls forming a shallow housing for mounting vertically on the exterior of a car wall, a drum shaft and a hand wheel shaft mounted parallel to each other within said shallow housing and journaled between said front and rear walls, a worm on the hand wheel shaft, a bevel gear on the drum shaft, a pinion shaft journaled within the housing and extending radially of said drum shaft adjacent to said worm, and a worm gear and bevel pinion on the pinion shaft engaging, respectively, with the worm and drum shaft gear, the lower portion of the housing directly beneath the drum shaft being open to receive a chain or the like adapted to be wound on the drum shaft as the brake is operated.

2. A hand brake as set forth in claim 1 in which the axis of the drum shaft and the axis of the hand wheel shaft lie in a generally vertical plane, and the axis of the pinion shaft is inclined from said plane by a relatively small acute angle so that it also lies in a generally vertical plane that intersects the first-mentioned generally vertical plane substantially at the axis of said drum shaft.

3. A hand brake as set forth in claim 1 in which a clutch is interposed between the worm gear and said beveled pinion, and means for engaging and disengaging the clutch to selectively engage and disengage the drum shaft from the hand wheel shaft.

4. A hand brake as set forth in claim 3 in which the clutch includes a collar telescoped over the pinion shaft, and co-acting clutch teeth on said collar and said worm gear, said worm gear being loose on the pinion shaft, and said beveled gear and clutch collar being non-rotatively fixed to said pinion shaft.

5. A hand brake as set forth in claim 3 in which said last-named means includes a weighted pivoted lever operatively connected to the clutch and adapted when in one position to urge the clutch into engaging position, and when in another position to urge the clutch into disengaging position.

JACK WILSON.

References Cited in the file of this patent

UNITED STATES PATENTS

| Number | Name | Date |
|---|---|---|
| 1,796,617 | O'Connor | Mar. 17, 1931 |
| 1,848,435 | Richards | Mar. 8, 1932 |
| 1,950,618 | Lounsbury | Mar. 13, 1934 |
| 2,082,964 | Lounsbury | June 8, 1937 |
| 2,090,757 | Heitner | Aug. 24, 1937 |
| 2,112,235 | Camp | Mar. 29, 1938 |
| 2,318,569 | Camp et al. | May 4, 1943 |